US012280337B2

(12) United States Patent
Tan et al.

(10) Patent No.: US 12,280,337 B2
(45) Date of Patent: Apr. 22, 2025

(54) SPIRAL SHEET PRODUCT AND METHOD OF MANUFACTURING THE SAME VIA ADDITIVE MANUFACTURING

(71) Applicant: Nanyang Technological University, Singapore (SG)

(72) Inventors: Wen See Tan, Singapore (SG); Jia An, Singapore (SG); Tzyy Haur Chong, Singapore (SG); Chee Kai Chua, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 18/043,106

(22) PCT Filed: Aug. 23, 2021

(86) PCT No.: PCT/SG2021/050493
§ 371 (c)(1),
(2) Date: Feb. 27, 2023

(87) PCT Pub. No.: WO2022/045972
PCT Pub. Date: Mar. 3, 2022

(65) Prior Publication Data
US 2024/0009626 A1 Jan. 11, 2024

(30) Foreign Application Priority Data
Aug. 27, 2020 (SG) .............................. 10202008238T (51) Int. Cl.
*B01D 63/10* (2006.01)
*B22F 10/28* (2021.01)
(Continued)

(52) U.S. Cl.
CPC ............ *B01D 63/101* (2022.08); *B22F 10/28* (2021.01); *B22F 10/47* (2021.01); *B22F 10/64* (2021.01);
(Continued)

(58) Field of Classification Search
None
See application file for complete search history.

(56) References Cited

U.S. PATENT DOCUMENTS

2013/0341264 A1* 12/2013 Kidwell .................. B29C 48/05
210/321.83

FOREIGN PATENT DOCUMENTS

WO 2022045972 A1 3/2022

OTHER PUBLICATIONS

Tan, "3D printing of feed channel spacers for spiral wound membrane modules", 2018, Nanyang Technological University, Doctoral Thesis. (Year: 2018).*

(Continued)

*Primary Examiner* — Xiaobei Wang
(74) *Attorney, Agent, or Firm* — Conley Rose, P.C.

(57) ABSTRACT

The present disclosure generally relates to a method of manufacturing a spiral sheet product via an additive manufacturing process, the method comprising: obtaining an electronic file representing a geometry of the spiral sheet product; and controlling an additive manufacturing apparatus to manufacture, via the additive manufacturing process, the spiral sheet product according to the geometry specified in the electronic file. The geometry of the spiral sheet product comprises: a geometric model of a spiral body revolving around a longitudinal axis, the spiral body comprising spiral sections repeating along the longitudinal axis; each spiral section comprising unit cells repeating along a spiral length of the spiral section; and each unit cell com- (Continued)

prising a geometric pattern, such that the repetitive geometric pattern functionalizes the spiral sheet product that is arrangeable into a flat sheet product that is larger than a build chamber of the additive manufacturing apparatus.

17 Claims, 6 Drawing Sheets

(51) Int. Cl.
  *B22F 10/47* (2021.01)
  *B22F 10/64* (2021.01)
  *B22F 10/68* (2021.01)
  *B22F 10/85* (2021.01)
  *B33Y 10/00* (2015.01)
  *B33Y 40/20* (2020.01)
  *B33Y 50/02* (2015.01)
  *B33Y 80/00* (2015.01)

(52) U.S. Cl.
  CPC .............. *B22F 10/68* (2021.01); *B22F 10/85* (2021.01); *B33Y 10/00* (2014.12); *B33Y 40/20* (2020.01); *B33Y 50/02* (2014.12); *B33Y 80/00* (2014.12); *B01D 2313/143* (2013.01); *B22F 2998/10* (2013.01); *Y10T 428/12153* (2015.01)

(56) References Cited

OTHER PUBLICATIONS

Foreign Communication from a Related Counterpart Application, International Search Report and Written Opinion dated Nov. 15, 2021, International Application No. PCT/SG2021/050493 filed on Aug. 23, 2021.

Wen See Tan, et al. "3D printing by selective laser sintering of polypropylene feed channel spacers for spiral wound membrane modules for the water industry," Virtual and Physical Prototyping, 11:3, 9 pages, Aug. 24, 2016, https://doi.org/10/1080/17452759.2016.1211925.

AashmanG, "3D Printing Pre-rolled Sheets." Feb. 19, 2017, 12 pages. [Retrieved on Nov. 12, 2021 from https://www.instructables.com/3D-Printing-Pre-rolled-Sheets/].

Tan, W. S., "3D Printing of Feed Channel Spacers for Spiral Wound Membrane Modules." Doctoral thesis, Nanyang Technological University, Singapore, 2018 [Retrieved on Dec. 6, 2021].

* cited by examiner

SPIRAL SHEET PRODUCT AND METHOD OF MANUFACTURING THE SAME VIA ADDITIVE MANUFACTURING

CROSS-REFERENCE TO RELATED APPLICATIONS

The present application is a filing under 35 U.S.C. 371 as the National Stage of International Application No. PCT/SG2021/050493, filed Aug. 23, 2021, entitled "SPIRAL SHEET PRODUCT AND METHOD OF MANUFACTURING THE SAME VIA ADDITIVE MANUFACTURING," which claims priority to Singapore Application No. SG 10202008238T filed with the Intellectual Property Office of Singapore on Aug. 27, 2020, both of which are incorporated herein by reference in their entirety for all purposes.

TECHNICAL FIELD

The present disclosure generally relates to a spiral sheet product. More particularly, the present disclosure describes various embodiments of the spiral sheet product and a method of manufacturing the spiral sheet product via an additive manufacturing process.

BACKGROUND

Additive manufacturing is a popular manufacturing process as it offers many benefits especially the possibility to produce complex parts by overcoming the constraints of traditional manufacturing processes. A common example of additive manufacturing is three-dimensional (3D) printing; however, other methods of additive manufacturing are available. Rapid prototyping or rapid manufacturing are also terms which may be used to describe additive manufacturing processes.

Additive manufacturing apparatuses are used to manufacture products via additive manufacturing, and these apparatuses commonly include 3D printers that come in various sizes. Despite the availability of 3D printers with many different sizes in the market, there is still a limitation on the maximum volume of build chambers of current 3D printers. Current 3D printers with some of the largest build chambers include the Stratasys Objet1000 which has a build chamber of 1000×800×500 mm, as well as the BigRep ONE v3 which has a build chamber of 1005×1005×1005 mm. More commonly, most of the current 3D printers have their build chambers constrained within the millimetres to centimetres scale. One problem with this is that current 3D printers cannot manufacture large parts, especially those in the metres scale and having dimensions larger than the build chambers of current 3D printers, that have commercial applications in many industries.

One way to manufacture large parts that are out-of-scale of current 3D printers is section a large part into several smaller portions and to print these smaller portions separately. The smaller portions are then assembled into the large part by physical means and/or chemical means. For example, the smaller portions are assembled by such as hook and lock elements that were predesigned into the smaller portions, and/or glue or epoxy to adhere the portions together. However, this assembly method may compromise the consistency and structural integrity of the final product if the joining/adhering means used were incompetent.

Therefore, in order to address or alleviate at least one of the aforementioned problems and/or disadvantages, there is a need to provide an improved method of manufacturing products via additive manufacturing.

SUMMARY

According to a first aspect of the present disclosure, there is a method of manufacturing a spiral sheet product via an additive manufacturing process, the method comprising: obtaining an electronic file representing a geometry of the spiral sheet product; and controlling an additive manufacturing apparatus to manufacture, via the additive manufacturing process, the spiral sheet product according to the geometry specified in the electronic file. The geometry of the spiral sheet product comprises: a geometric model of a spiral body revolving around a longitudinal axis, the spiral body comprising spiral sections repeating along the longitudinal axis; each spiral section comprising unit cells repeating along a spiral length of the spiral section; and each unit cell comprising a geometric pattern, such that the repetitive geometric pattern functionalizes the spiral sheet product that is arrangeable into a flat sheet product that is larger than a build chamber of the additive manufacturing apparatus.

According to a second aspect of the present disclosure, there is a spiral sheet product manufactured via an additive manufacturing process, the spiral sheet product comprising: a spiral body revolving around a longitudinal axis, the spiral body comprising spiral sections repeating along the longitudinal axis; each spiral section comprising unit cells repeating along a spiral length of the spiral section; and each unit cell comprising a geometric pattern, wherein the spiral sheet product is functionalized by the repetitive geometric pattern and is arrangeable into a flat sheet product that is larger than a build chamber of the additive manufacturing apparatus.

A spiral sheet product and a method of manufacturing the spiral sheet product via an additive manufacturing process according to the present disclosure are thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

For purposes of brevity and clarity, descriptions of embodiments of the present disclosure are directed to a method of manufacturing a spiral sheet product via an additive manufacturing process, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range.

In representative or exemplary embodiments of the present disclosure, there is a method of manufacturing a spiral sheet product 100 via an additive manufacturing process. The method includes obtaining an electronic file representing a geometry of the spiral sheet product 100. The method further includes controlling an additive manufacturing apparatus to manufacture, via the additive manufacturing process, the spiral sheet product 100 according to the geometry specified in the electronic file.

Figure 1:
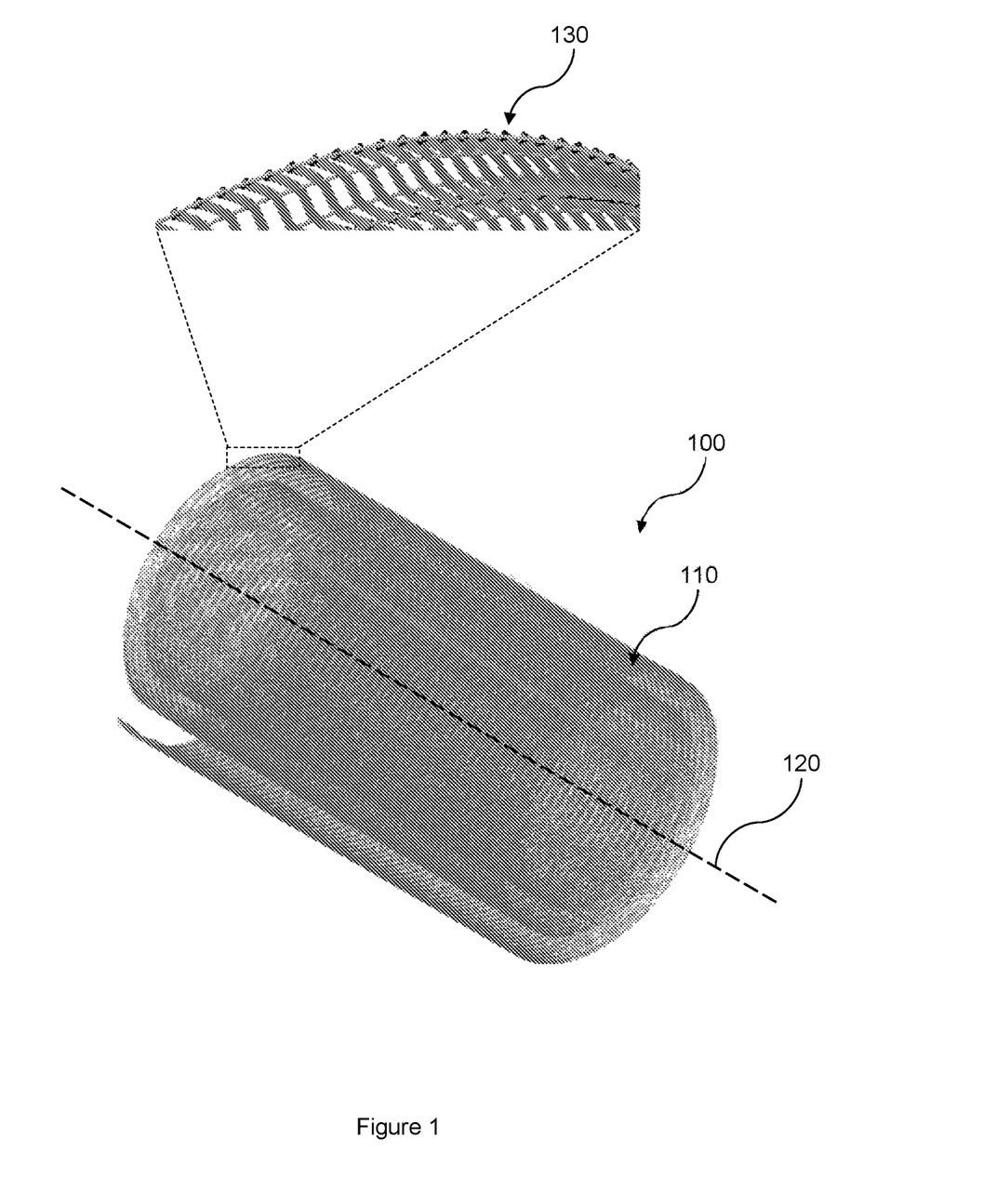
FIG. 1 is an illustration of a spiral sheet product.

As shown in FIG. 1, the geometry of the spiral sheet product 100 includes a geometric model of a spiral body 110 revolving around a longitudinal axis 120. The spiral body 110 includes spiral sections 130 repeating along the longitudinal axis 120. As used herein, "spiral" means winding or coiling in a continuous and gradually widening curve around the longitudinal axis 120. Additionally, each spiral section 130 spirals on a plane normal to the longitudinal axis 120.

Figure 2:
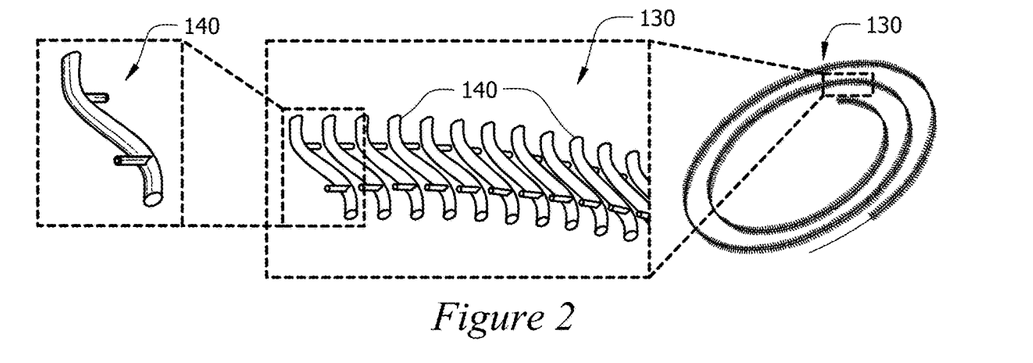
FIG. 2 is an illustration of a spiral section and unit cell of the spiral sheet product.

Further as shown in FIG. 2, each spiral section 130 includes unit cells 140 repeating along a spiral length of the spiral section 130. Each unit cell 140 has a geometric pattern, such that the repetitive geometric pattern functionalizes the spiral sheet product 100. For example, the geometric pattern enables the respective spiral section to form a mesh pattern which functionalizes the spiral sheet product 100 into a meshed sheet product for functionalities such as filtration of liquids.

Figure 3:
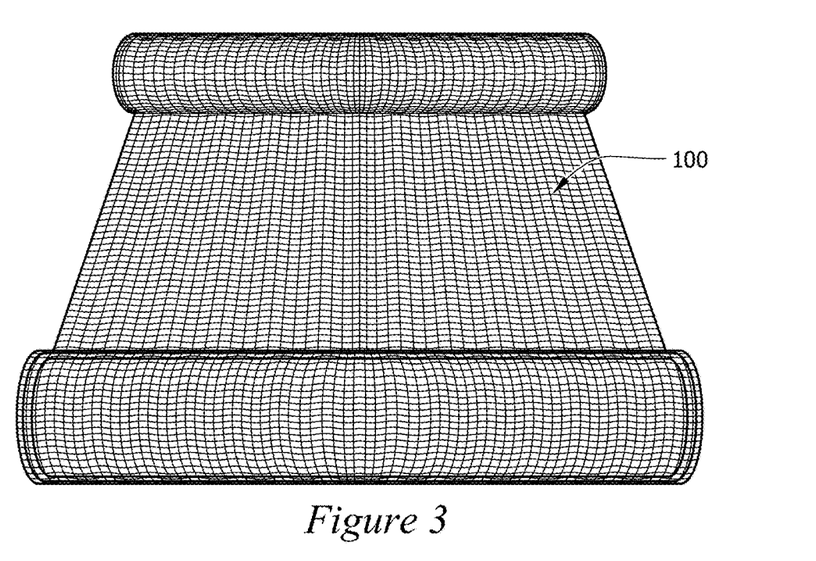
FIG. 3 is an illustration of the spiral sheet product arranged into a flat sheet product.

Additionally, as shown in FIG. 3, the spiral sheet product 100 is arrangeable into a flat sheet product so that the flat sheet product can be manufactured into other products. When the spiral sheet product 100 is flattened, the flat sheet product that is larger than the build chamber or volume of the additive manufacturing apparatus and has dimensions (length-wise and width-wise) that are larger than the original spiral sheet product 100. For example, the additive manufacturing apparatus that manufactures the spiral sheet product 100 includes a 3D printer such as the EOS P 396 3D printer which has a build chamber of 340×340×600 mm. The spiral sheet product 100 has a maximum height of 600 mm along the longitudinal axis 120 and a maximum diameter of 340 mm so that it fits within the build chamber. As an example, the spiral sheet product 100 has a height of 500 mm and approximately four complete revolutions around the longitudinal axis 120, each revolution having an average diameter of approximately 200 mm. When the spiral sheet product 100 is flattened, the flat sheet product will have dimensions of approximately 2500×500 mm. Notably, the spiral length of the spiral body 110 or each spiral section 130 is approximately 2500 mm. The thickness of the flat sheet product will depend on the thickness of the spiral body 110 or each spiral section 130.

Therefore, by manufacturing a spiral sheet product 100 first before flattening it, a flat sheet product with dimensions larger than the build chamber of the 3D printer can still be manufactured via the same additive manufacturing process. This manufacturing method addresses the build chamber limitation of current 3D printers and can be used to fabricate large flat sheet products in the metres scale, even up to several metres in length.

This method allows fabrication of large sheet products within the build chamber limitation of current 3D printers, thus obviating the need to purchase even larger 3D printers and saving costs for the manufacturer. Large sheet products can be more quickly fabricated as there is no need to existing steps of sectioning the large sheet product into smaller parts, printing the parts separately, and finally assembling the parts together. This improves the time efficiency for designing and fabrication of a large sheet product. By obviating the assembling step, the large sheet product can be manufactured in a single printing process, resulting in better consistency and structural integrity of the product.

In some embodiments, obtaining the electronic file includes a computer-implemented or computerized method of generating the geometry of the spiral sheet product. The computerized method is performed on a computing device that contains one or more processors. The computing device may include a personal computer, laptop, server, mobile device, etc. The computerized method is performed using a computer aided design (CAD) software.

The computerized method includes a step of creating a first unit cell 140 having the geometric pattern. As the unit cells 140 are the smallest units of the spiral sheet product 100 to be manufactured using the additive manufacturing apparatus, the dimensions of the first unit cell 140 and the geometric pattern should be within the printing resolution of the additive manufacturing apparatus. For example, if the additive manufacturing apparatus is the EOS P 396 3D printer, then the dimensions should be at least 0.3 mm.

Figure 4:
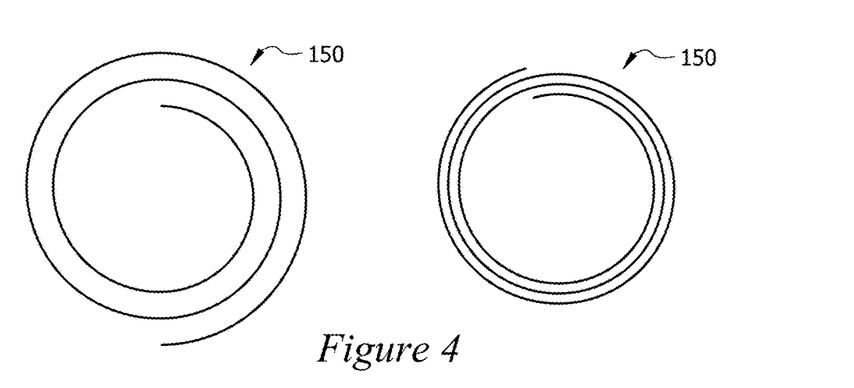
FIG. 4 is an illustration of spiral paths of a geometric model of the spiral sheet product.

As shown in FIG. 4, the computerized method includes a step of defining the longitudinal axis 120 and a spiral path 150 revolving around the longitudinal axis 120, the spiral path 150 having pitch and revolution parameters. The pitch parameter refers to the gap of the spiral path 150 as it spirals around and away from the longitudinal axis 120. The revolution parameter refers to the number of revolutions of the spiral path 150 around the longitudinal axis 120. Notably, as shown in FIG. 4, to increase the spiral length of the spiral path 150 which would result in larger dimensions for the spiral sheet product 100, the pitch parameter can be decreased and/or the revolution parameter can be increased.

The computerized method includes a step of repeating the first unit cell 140 along the spiral path 150 to generate a first spiral section 130 having the unit cells 140 repeating along the spiral length. As shown in FIG. 1, the computerized method includes a step of defining a height H for the spiral body 110 along the longitudinal axis 120. Notably, the height H should be within the height of the build chamber, such as 600 mm for the EOS P 396 3D printer.

The computerized method includes a step of repeating the first spiral section 130 along the longitudinal axis 120 and through the height H to generate the geometric model of the spiral body 110 having the spiral sections 130 repeating along the height H. The computerized method includes a step of generating the geometry of the spiral sheet product 100 in the electronic file. The electronic file may also be referred to as a design file or CAD file, as described further below.

Figure 5:
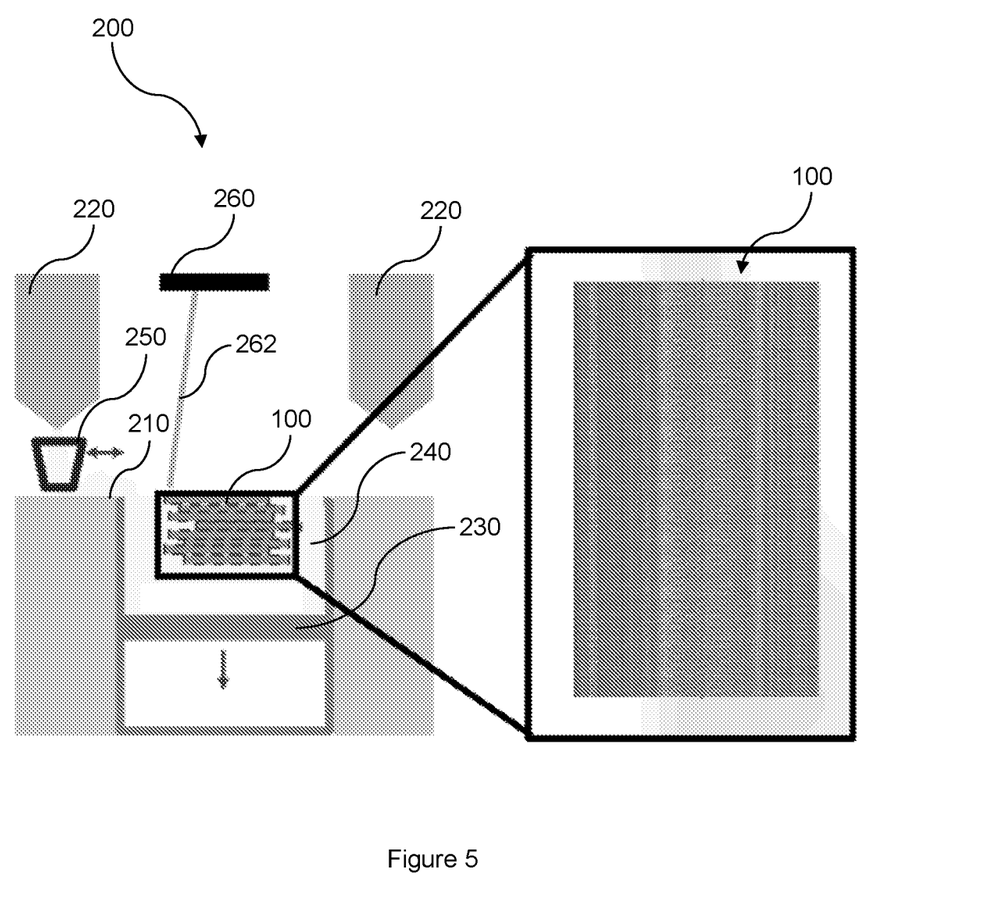
FIG. 5 is an illustration of an additive manufacturing apparatus for manufacturing the spiral sheet product.

In some embodiments, the additive manufacturing process includes laser powder bed fusion such as selective laser melting. As shown in FIG. 5, the laser powder bed fusion is performed using an additive manufacturing apparatus 200 such as the powder-based EOS P 396 3D printer. The apparatus 200 includes a powder bed 210, one or more supply bins 220, a build platform 230, a build chamber 240, a displacer 250, and a laser assembly 260. The default or recommended printing parameters by the manufacturer of the apparatus 200 can be used for controlling the additive manufacturing apparatus 200 and process. Controlling of the apparatus 200 includes orientating the CAD model or geometry of the spiral sheet product 100 in the electronic file according to the software of the apparatus 200 such that the spiral sheet product 100 will be manufactured vertically upwards in the build chamber 240.

The supply bins 220 contain the material powder for manufacturing into the spiral sheet product 100. Preferably, the material powder is a flexible material such as nylon powder. The flexible material allows the spiral sheet product 100 to be arranged and flattened into the flat sheet product for further manufacturing into other products. For example, the material powder includes EOS PA2200 printing material. The displacer 250, also referred to as a recoater or roller, is configured to displace the material powder across the powder bed 210 from the supply bins 220 to the build platform 230. The laser assembly 260 is configured to laser 262 the material powder on the build platform 230 while the build platform 230 moves downwards to manufacture the spiral sheet product 100 upwards in the build chamber 240.

The method of manufacturing the spiral sheet product 100 may include performing a set of treatment processes on the spiral sheet product 100. The treatment processes may include cooling the spiral sheet product 100 in the apparatus 200. Specifically, for the spiral sheet product 100 printed via laser powder bed fusion, the spiral sheet product 100 should be cooled in the apparatus 200 for at least 2 days at room temperature or shorter if there is ventilation. This is to mitigate risk of damage to the spiral sheet product 100 when removing it from the apparatus 200 as some parts may still be delicate and vulnerable to breakage especially when the spiral sheet product 100 is still trapped in the heated build chamber 240.

After cooling to room temperature, the spiral sheet product 100 is removed from the apparatus 200 and moved to another location for further treatment processes, which may include removing waste material from the spiral sheet product 100, such as a number of supporting structures and loose material powder. For example, the spiral sheet product 100 may have one or more supporting structures to facilitate the manufacturing process, and there may be some loose material powder that are not properly fused by the lasering 262. The supporting structures extend through a centre region of the spiral body 110, and preferably along the longitudinal axis 120, to support the spiral sheet product 100 during removal of the loose material powder.

The loose material powder should be gently removed by manually sweeping them with brushes from the top to the bottom, including the outer and inner regions, of the spiral sheet product 100. Specifically, after the spiral sheet product 100 is cooled and in the dry state, a gentle brush such as a toothbrush may be used to brush away the loose material powder. Alternatively or additionally, an air gun for low pressure abrasive blasting may be used to blow away the loose material powder. The pressure of the air gun should be very small, such as below 2 bars, to mitigate risk of breaking the spiral sheet product 100.

Comparatively, instead of the top-down approach, if the loose material powder were removed from outer region first and then the spiral sheet product 100 is unwind from the outside region, the material powder that is still in the inner region would collapse and fall on the spiral sheet product 100 as there is no longer support from the outer region, causing breakages in the spiral sheet product 100. The top-down approach thus allows the loose material powder to be evenly removed from the top to the bottom of the spiral sheet product 100, preventing the avalanche of material powder from the inner and centre region of the spiral sheet product 100 which would damage the delicate printed parts of the spiral sheet product 100.

Figure 6:
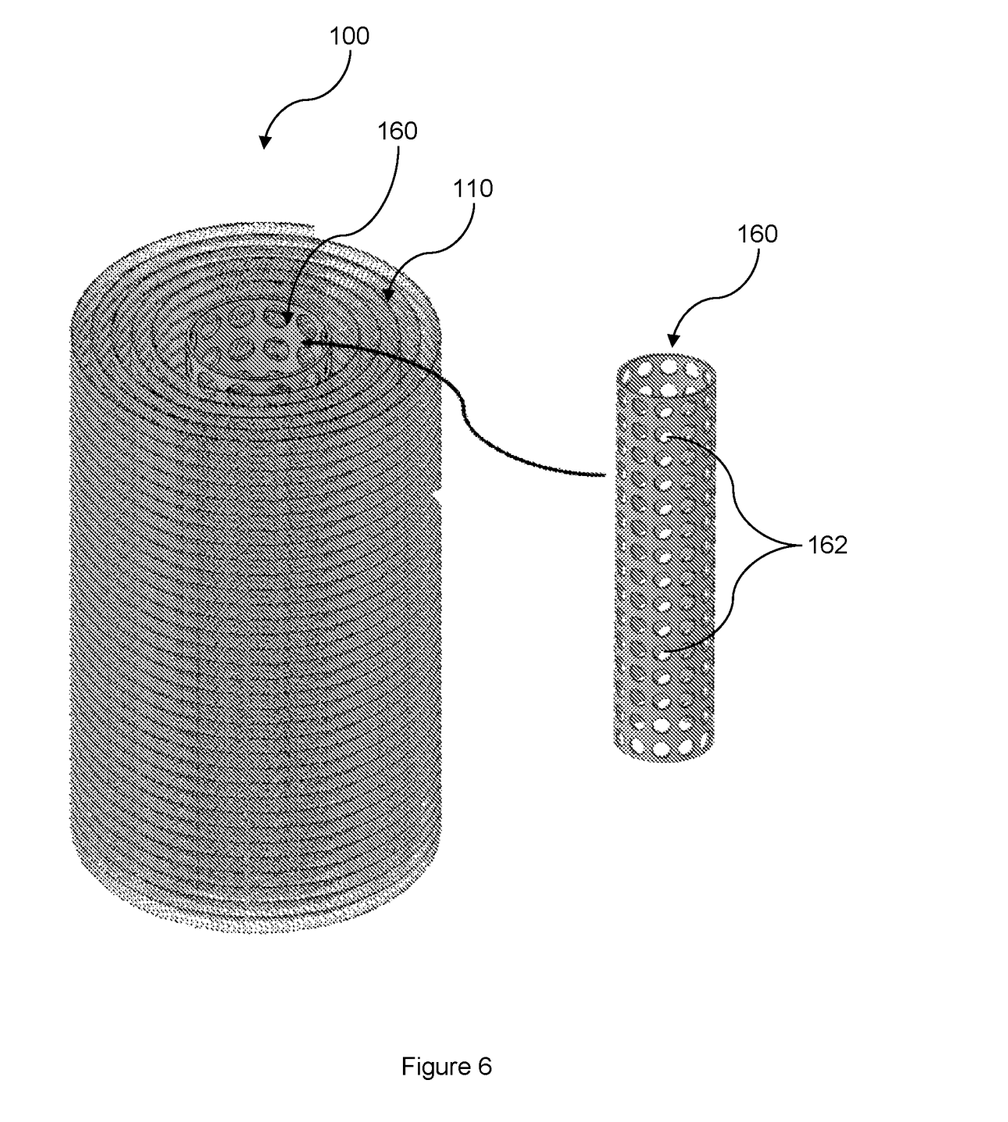
FIG. 6 is another illustration of the spiral sheet product having a perforated tubular structure.

In one embodiment as shown in FIG. 6, to facilitate the removal of loose material powder, the spiral sheet product 100 includes at least one supporting structure 160 extending through the centre region of the spiral body 110. Preferably, the supporting structure 160 extends along the longitudinal axis 120, but may alternatively extend in directions oblique to the longitudinal axis 120. The geometry of the spiral sheet product 100 represented in the electronic file includes a geometric model of the supporting structure 160, such that the spiral sheet product 100 is manufactured by the apparatus 200 together with the supporting structure 160. The supporting structure 160 provides a rigid central support for the spiral sheet product 100 and prevents it from toppling during removal of loose material powder manually or with the air gun. As shown in FIG. 6, the supporting structure 160 may include a perforated tubular structure having perforations 162. Air flow from the air gun can flow from one side of the spiral sheet product 100 through its centre and the perforations 162 to the opposite side, thereby facilitating removal of loose material powder by air blasting. Although only one supporting structure 160 is shown as the perforated tubular structure, it will be appreciated that the spiral sheet product 100 can have one or more supporting structures 160 in the form of the perforated tubular structure or other forms, and may extend in directions parallel to or oblique to the longitudinal axis 120.

The treatment processes may further include, after removing the waste material, washing the spiral sheet product 100 under running water and an ultrasonication process to remove any residual loose material powder. The ultrasonication process may include sonicating the washed spiral sheet product 100 for 1 hour in an ultrasonicator that is filled with a cleaning agent such as Decon 90 or Triton. The ultrasonication process may further include sonicating for another 15 minutes with purified water such as Milli Q water. The treatment processes may further include, after the ultrasonication process, washing the spiral sheet product 100 under running water and then drying it before storage or usage.

In some embodiments, the treatment processes further include vapour smoothing surfaces of the spiral sheet product 100. The spiral sheet product 100 is exposed to a vapour, such as gaseous acetone, that makes the surfaces smoother, stronger, and seals the surfaces from liquid or gas penetration. Vapor smoothing also enables the spiral sheet product 100 to achieve a smooth surface finish that is similar to injection moulding.

In some embodiments, the additive manufacturing process comprises photopolymerization and the apparatus 200 may include a liquid-based 3D printer. For liquid photopolymerization, supporting structures to facilitate manufacturing of the spiral sheet product 100 need to be removed from the base of the spiral sheet product 100 by manual cutting or trimming as part of the post-printing treatment processes. Solid-based 3D printers may also be used to manufacture the spiral sheet product 100, provided that the printing material is flexible and elastic enough to be rolled up and unrolled after printing. Various examples of additive manufacturing processes are described further below.

As described above, the spiral sheet product 100 has the spiral body 110 including the spiral sections 130 and respective unit cells 140. The unit cells 140 have the geometric pattern that is duplicated throughout the spiral body 110 to functionalize the spiral sheet product 100. Optionally, the spiral sheet product 100 includes the supporting structure 160, such as the perforated tubular structure, to facilitate cleaning of the spiral sheet product 100.

The spiral sheet product 100 is arrangeable into a flat sheet product and in some embodiments, the flat sheet product includes a meshed or net-like sheet product. The meshed sheet product is manufacturable into other products such as one or more feed spacers for spiral wound membrane (SWM) modules 300. SWM modules 300 can be used in various membrane applications such as reverse osmosis, gas permeation, and micro/ultra/nano-filtration.

Figure 7A:
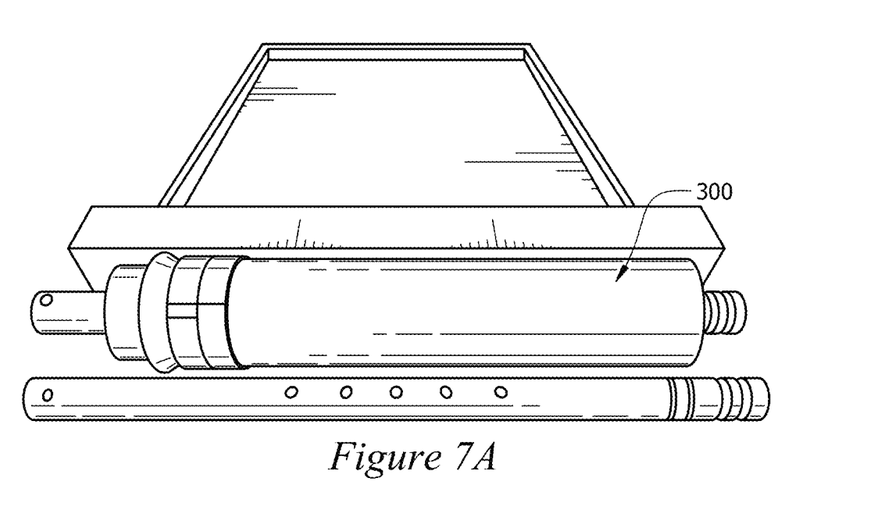
FIG. 7 is an illustration of a spiral wound membrane module manufactured from the spiral sheet product.
Figure 7B:
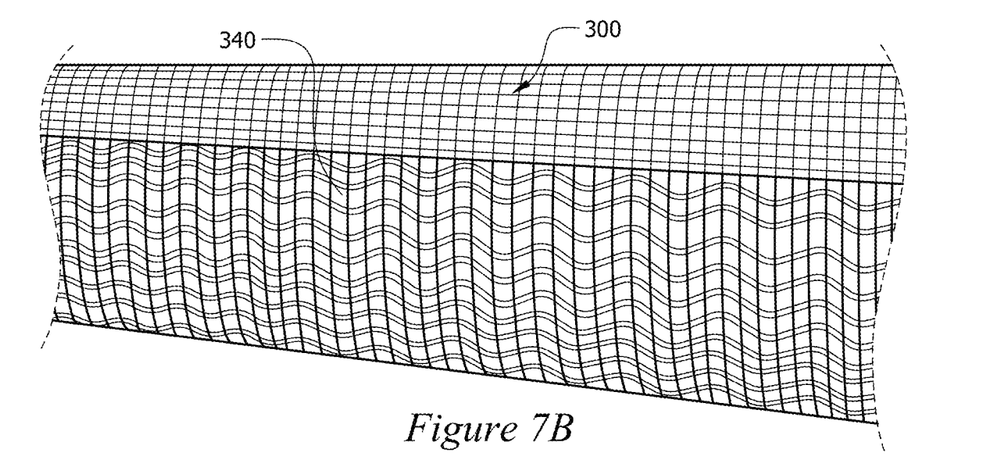
Figure 8:
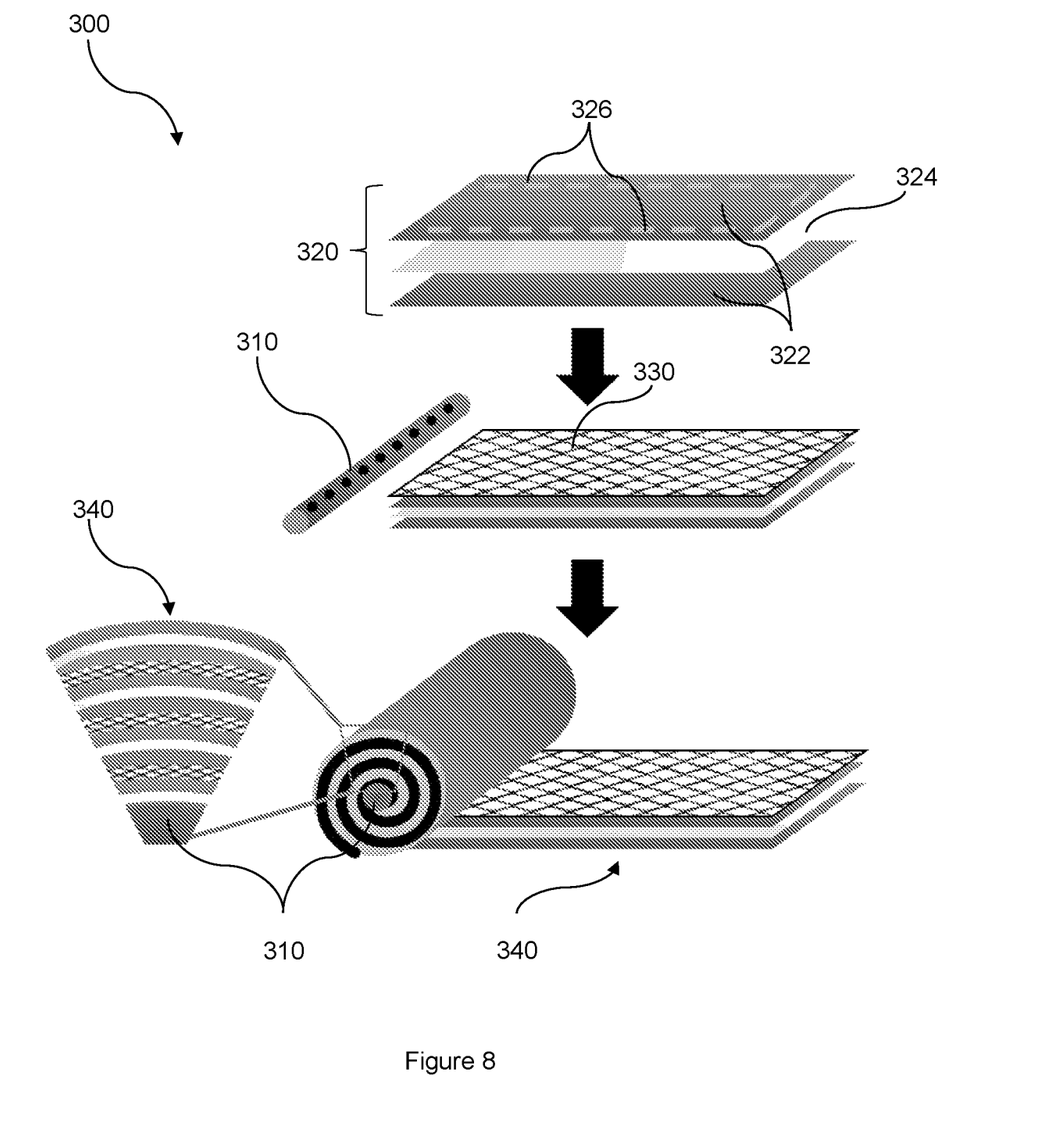
FIG. 8 is an illustration of manufacturing the spiral wound membrane module from the spiral sheet product.

As shown in FIG. 7 and FIG. 8, an exemplary SWM module 300 includes a central permeate tube 310 that forms the core of the SWM module 300. The SWM module 300 includes a membrane composite 320 and a feed spacer 330. The membrane composite 320 includes a pair of membrane layers 322 and a permeate carrier layer 324 interposed between the membrane layers 322. The membrane composite 320 is attached to the feed spacer 330 to form a composite structure 340. The composite structure 340 is then attached to the central permeate tube 310 by adhering the membrane composite 320 to the central permeate tube 310 via joining lines 326 on one of the membrane layers 322. The joining lines 326 include a joining agent such as an adhesive or bonding agent (e.g. glue). The composite structure 340 is then rolled up around the central permeate tube 310, creating a spiral cross-section and forming the SWM module 300.

The purpose of the feed spacer 330 is to provide channels for fluid flow between the membrane layers 322. As mentioned above, the feed spacer 330 may be made from the spiral sheet product 100 that is manufactured via additive manufacturing. For example, the feed spacer 330 is cut to size, such as 1000×500 mm, from the flat meshed sheet product resulting from the spiral sheet product 100. Notably, the spiral sheet product 100 can be manufactured with suitable dimensions that enable multiple feed spacers 330 to be fabricated from it.

In some embodiments, the manufacturing method may include controlling the additive manufacturing apparatus 200 to manufacture a plurality of the spiral sheet products 100 consecutively and/or nested together. For example, the apparatus 200 software duplicates the geometry of the spiral sheet product 100 represented in the electronic file and manufactures multiple copies of the spiral sheet product 100 consecutively in a single operation. Alternatively or additionally, the electronic file represents multiple copies of the spiral sheet product 100 in a nested assembly, also known as 3D nesting, such that these copies can be manufactured simultaneously in the same build layer, thereby saving time and improving productivity.

A plurality of the spiral sheet products 100 can be joined together for expansion. For example, two or more spiral sheet products 100 are arranged into the respective flat sheet products which are then joined together at the respective edges to form a larger flat sheet product. The edges may be joined by various means such as, but not limited to, heat sealing and ultrasonic bonding. Moreover, the spiral sheet products 100 that are joined together may have different functionalities because of different repetitive geometric patterns, thereby imparting these functionalities into the single joined product.

Therefore, by manufacturing one or more spiral sheet products 100 in the additive manufacturing apparatus 200, large flat sheet products can be produced without being constrained by the size limitation of current apparatuses 200 such as 3D printers. This manufacturing method can be applied in various additive manufacturing apparatuses for manufacturing various products including the spiral sheet product 100, as generally described below.

As used herein, "additive manufacturing" refers generally to manufacturing processes wherein successive layers of material(s) are provided on each other to "build-up" layer-by-layer or "additively fabricate", a 3D component, part, or product. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the present disclosure to be integrally formed and include a variety of features not possible when using prior manufacturing methods. As used herein, the terms "component", "part", and "product" may be used interchangeably in the present disclosure.

Additive manufacturing methods described herein enable manufacture to any suitable size and shape with various features which may not have been possible using prior manufacturing methods. Additive manufacturing can create complex geometries without the use of any sort of tools, moulds, or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modelling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNS), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM), and other known processes.

The additive manufacturing processes described herein may be used for forming components using any suitable material. For example, the material may be metal, plastic, polymer, composite, or any other suitable material that may be in solid, liquid, powder, sheet material, wire, or any other suitable form or combinations thereof. More specifically, according to exemplary embodiments of the present disclosure, the additively manufactured components described herein may be formed in part, in whole, or in some combination of materials suitable for use in additive manufacturing processes and which may be suitable for the fabrication of examples described herein.

As noted above, the additive manufacturing process disclosed herein allows a single component to be formed from multiple materials. Thus, the examples described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on 3D information, for example a 3D computer model (or design file), of the component. Accordingly, examples described herein not only include products or components as described herein, but also methods of manufacturing such products or components via additive manufacturing and computer software, firmware or hardware for controlling the manufacture of such products via additive manufacturing.

The structure of the product may be represented digitally in the form of an electronic file or a design file. A design file, or computer aided design (CAD) file, is a configuration file that encodes one or more of the surface or volumetric configuration of the shape of the product. That is, a design file represents the geometrical arrangement or shape of the product.

Design files can take any now known or later developed file format. For example, design files may be in the Stereolithography or "Standard Tessellation Language" (.stl) format which was created for Stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any 3D object to be fabricated on any additive manufacturing printer. Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist.

Design files can be produced using modelling (e.g. CAD modelling) software and/or through scanning the surface of a product to measure the surface configuration of the product. Once obtained, a design file may be converted into a set of computer executable instructions that, once executed by a processor, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known CAD software systems such as AutoCAD®, SolidWorks®, TurboCAD®, DesignCAD 3D Max, etc. Alternatively, a model or prototype of the product may be scanned to determine the 3D information of the product. Accordingly, by controlling an additive manufacturing apparatus according to the computer executable instructions, the additive manufacturing apparatus can be instructed to print out the product.

In light of the above, embodiments include methods of manufacture via additive manufacturing. This includes the steps of obtaining a design file representing the product and instructing an additive manufacturing apparatus to manufacture the product according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing apparatus. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing apparatus.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

In the foregoing detailed description, embodiments of the present disclosure in relation to a method of manufacturing a spiral sheet product 100 via an additive manufacturing process are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A spiral sheet product manufactured via an additive manufacturing process performed by an additive manufacturing apparatus, the spiral sheet product comprising:
    a spiral body revolving around a longitudinal axis;
    at least one supporting structure extending through a center region of the spiral body and spaced apart from the spiral body;
    the spiral body comprising spiral sections repeating along the longitudinal axis;
    each spiral section comprising unit cells repeating along a spiral length of the spiral section; and
    each unit cell comprising a geometric pattern, such that the geometric pattern is repetitive along the unit cells,
    wherein the spiral sheet product is functionalized by the repetitive geometric pattern and is arrangeable into a flat sheet product that is larger than a build chamber of the additive manufacturing apparatus; and
    wherein the at least one supporting structure is arranged to prevent toppling of the spiral sheet product during post-treatment of the spiral sheet product.

2. The spiral sheet product according to claim 1, wherein the supporting structure comprises a perforated tubular structure.

3. The spiral sheet product according to claim 1, wherein the additive manufacturing process comprises laser powder bed fusion or photopolymerization.

4. The spiral sheet product according to claim 1, wherein the geometric pattern comprises a mesh pattern.

5. The spiral sheet product according to claim 1, wherein the flat sheet product comprises a meshed sheet product.

6. The spiral sheet product according to claim 5, wherein the meshed product is manufacturable into one or more feed spacers for spiral wound membrane modules.

7. A method of manufacturing the spiral sheet product of claim 1 via an additive manufacturing process, the method comprising:
    obtaining an electronic file representing a geometry of the spiral sheet product; and
    controlling an additive manufacturing apparatus to manufacture, via the additive manufacturing process, the spiral sheet product according to the geometry specified in the electronic file,
    wherein the geometry of the spiral sheet product comprises:
        a geometric model of a spiral body revolving around a longitudinal axis, the spiral body comprising spiral sections repeating along the longitudinal axis;
        each spiral section comprising unit cells repeating along a spiral length of the spiral section;
        each unit cell comprising a geometric pattern, such that the geometric pattern is repetitive along the unit cells,
        wherein the spiral sheet product is functionalized by the repetitive geometric pattern and is arrangeable into a flat sheet product that is larger than a build chamber of the additive manufacturing apparatus; and
        at least one supporting structure extending through a center region of the spiral body and spaced apart from the spiral body, wherein the at least one supporting structure is arranged to prevent toppling of the spiral sheet product during post-treatment of the spiral sheet product.

8. The method according to claim 7, wherein the geometric pattern comprises a mesh pattern.

9. The method according to claim 7, wherein the supporting structure comprises a perforated tubular structure.

10. The method according to claim 7, wherein the additive manufacturing process comprises laser powder bed fusion or photopolymerization.

11. The method according to claim 7, wherein obtaining the electronic file comprises a computerized method of generating the geometry of the spiral sheet product, the computerized method comprising:
   creating a first unit cell comprising the geometric pattern;
   defining the longitudinal axis and a spiral path revolving around the longitudinal axis, the spiral path having pitch and revolution parameters;
   repeating the first unit cell along the spiral path to generate a first spiral section comprising the unit cells repeating along the spiral length;
   defining a height for the spiral body along the longitudinal axis;
   repeating the first spiral section along the longitudinal axis and through the height to generate the geometric model of the spiral body comprising the spiral sections repeating along the height.

12. The method according to claim 7, further comprising performing a set of treatment processes on the spiral sheet product.

13. The method according to claim 12, wherein the treatment processes comprise cooling the spiral sheet product.

14. The method according to claim 12, wherein the treatment processes comprise removing waste material from the spiral sheet product.

15. The method according to claim 12, wherein the treatment processes comprise vapour smoothing surfaces of the spiral sheet product.

16. The method according to claim 7, comprising controlling the additive manufacturing apparatus to manufacture a plurality of the spiral sheet products nested together.

17. The method according to claim 16, comprising joining the plurality of the spiral sheet products together.

* * * * *